Oct. 8, 1935.  A. W. ARNOLD  2,016,849
POWER TRANSMITTING APPARATUS
Filed Dec. 13, 1933  2 Sheets-Sheet 1
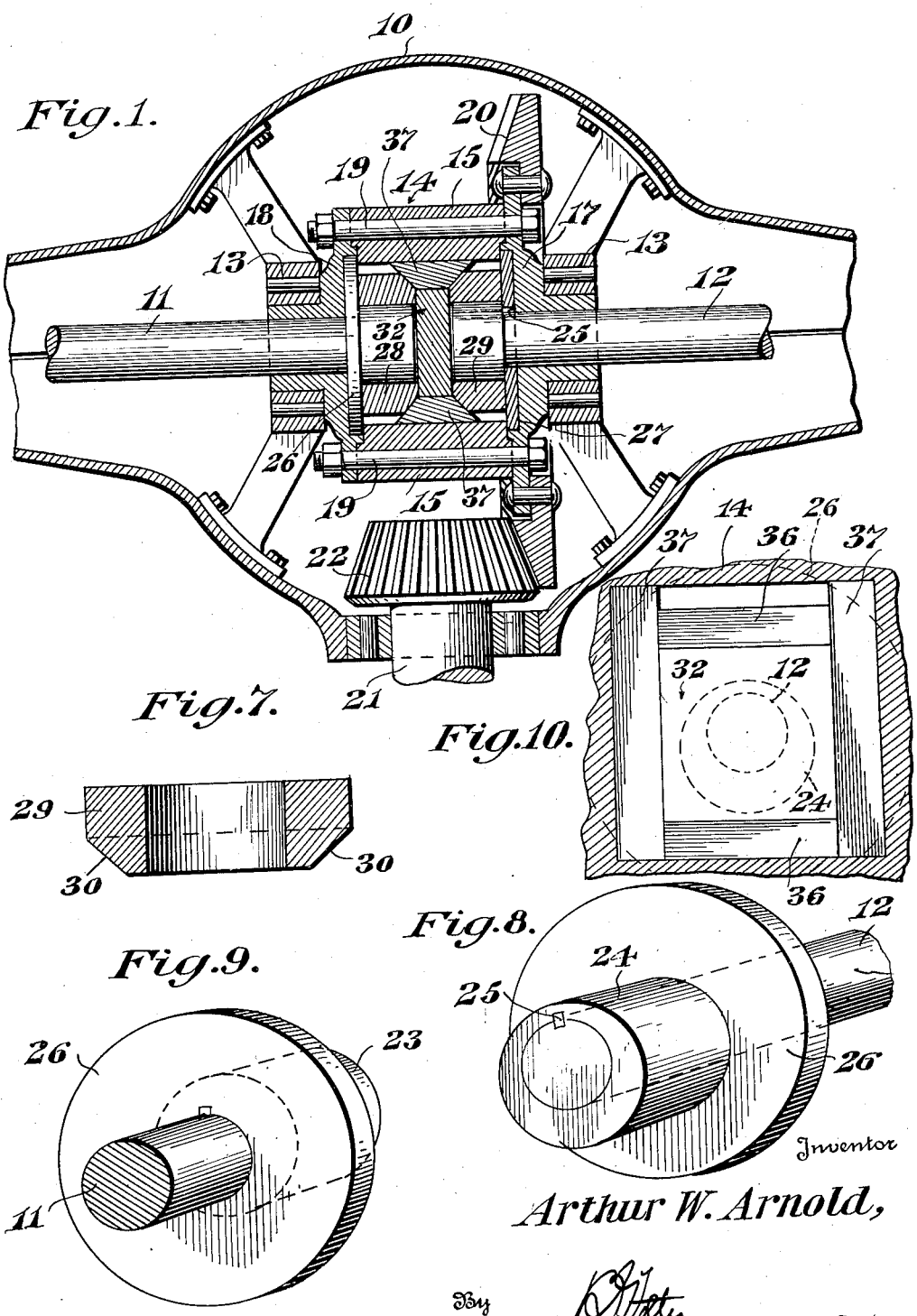

Oct. 8, 1935.  A. W. ARNOLD  2,016,849
POWER TRANSMITTING APPARATUS
Filed Dec. 13, 1933  2 Sheets-Sheet 2
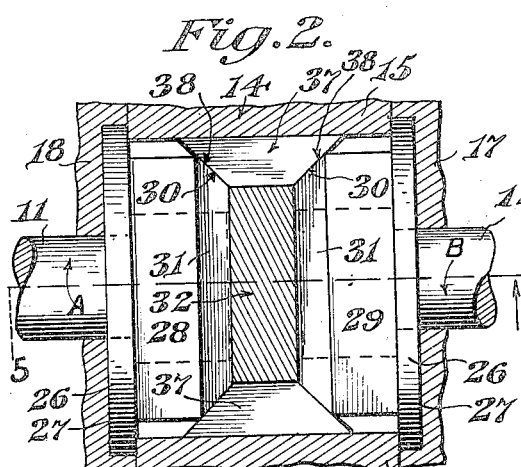
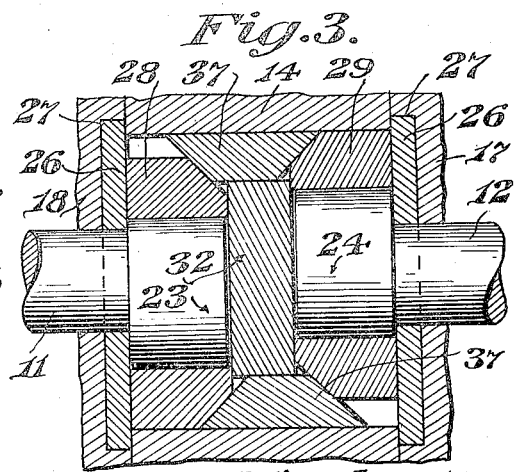
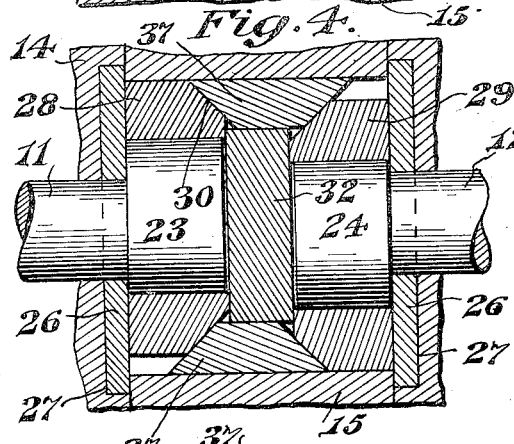
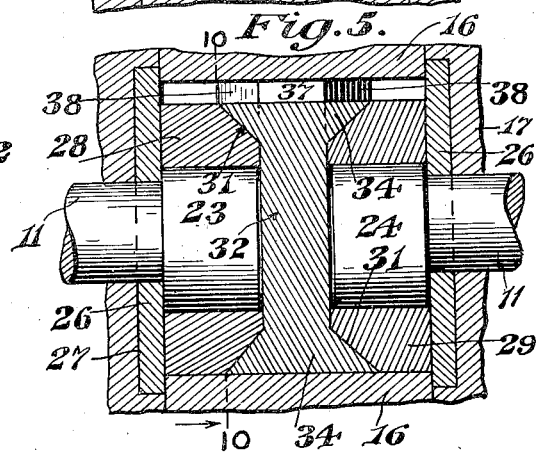
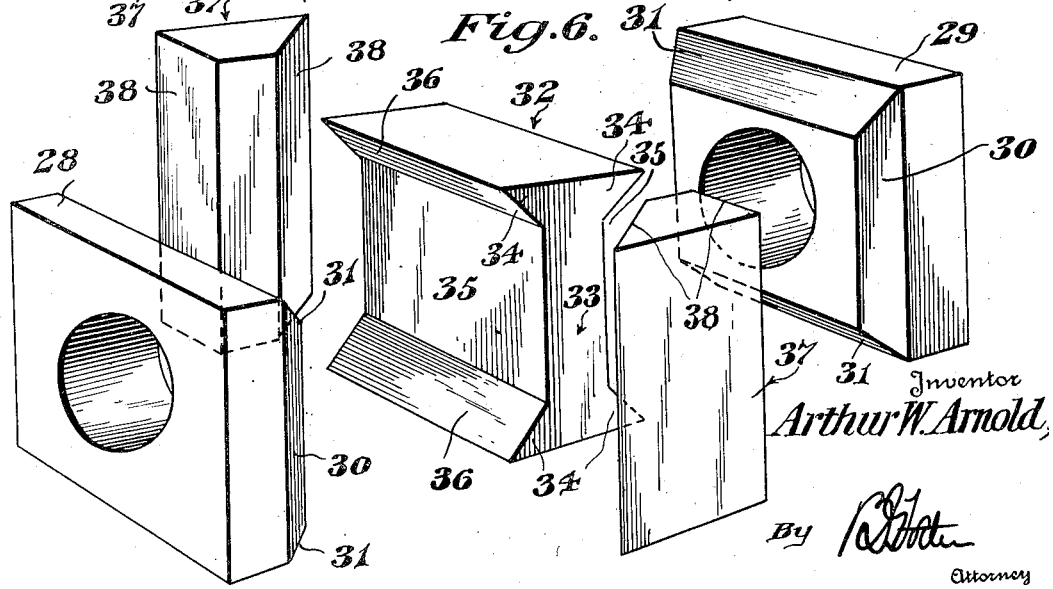
Inventor
Arthur W. Arnold,
By
Attorney Patented Oct. 8, 1935

2,016,849

UNITED STATES PATENT OFFICE 2,016,849

POWER TRANSMITTING APPARATUS

Arthur W. Arnold, Portland, Oreg.

Application December 13, 1933, Serial No. 702,207

17 Claims. (Cl. 74—389.5)

In mechanism where a prime mover is employed to operate a plurality of members and in which the driven members at times are required to have relative movements and at other times to be driven at the same rate of speed, it has been found desirable further when the resistance to the operation of one becomes less than that to the other, that the driving force be continued unabated to the member having the greater resistance to its movement.

As an example, the driving mechanism for two automobile wheels may be mentioned. With the ordinary gear differential employed, power is transmitted equally to both wheels when the traction and speed thereof is equal. In turning, however, one wheel must rotate slower than the other and this difference in speed is taken care of by the differential. But should one wheel encounter a slippery surface, the wheel still having traction often comes to or remains at a complete stop and the driving power will be transmitted to the wheel engaged with the slippery surface, causing it to spin, but resulting in no progress on the part of the automobile.

The present invention relates to mechanism of the general type first outlined and while particularly useful in apparatus of the type set forth in the concrete example above given, is not restricted to such specific employment.

One of the objects is to provide mechanism of a peculiarly simple and at the same time highly effective character, by which power can be transmitted from a prime mover to a plurality of driven parts capable of relative movement, so that under normal conditions the two driven parts are positively locked together and therefore the driving force will be transmitted equally to both. Yet should resistance to the movement of one fail or drop below that afforded to the other, the ineffective driven member will not absorb all the driving power but the other will continue to be positively operated and thus cause the driven members or either of them to be effectively operated irrespective of the varying conditions encountered. At the same time if one of the driven members is caused to move at a slower or faster rate than the other, these changes are fully accommodated and the driving power still continues to be effectively applied to both under such conditions.

In the accompanying drawings and for the purposes of exemplification, the invention is shown as embodied in a differential drive for automobile wheels.

In said drawings:

Figure 1 is a longitudinal sectional view through the novel differential transmission mechanism.

Figure 2 is a detail sectional view of the differential transmission parts shown in Figure 1, but on a larger scale, with certain of the said parts in elevation.

Figure 3 is a detail sectional view of the same parts shown in Figure 2, but illustrating them in a different extreme relation.

Figure 4 is a view similar to Figure 3, but illustrating the parts in their opposite extreme relation.

Figure 5 is a sectional view at right angles to Figures 2, 3 and 4, or on the line 5—5 of Figure 2.

Figure 6 is a detail perspective view illustrating the parts in separated relation.

Figure 7 is a detail sectional view of one of the transverse gyratory blocks.

Figure 8 is a perspective view of one end portion of one of the shafts.

Figure 9 is a perspective view of the corresponding portion of the other shaft.

Figure 10 is a sectional view on the line 10—10 of Figure 5.

The structure as ilustrated in Figure 1 is shown in an ordinary transmission housing 10, in which are the oppositely extending alined and relatively rotatable driven shafts 11 and 12, the same, as is well known, having on their outer ends the driving wheels of the automobile.

Suitably journaled, as indicated at 13, in the housing is the novel differential driving mechanism. This mechanism includes a cage, container, or housing 14 having opposite bearing walls 15, casing walls 16 at right angles to the bearing walls 15, and end walls 17 and 18. The various walls are held in assembled relation by suitable bolts 19 extending through the same, the whole providing a rigid casing or shell that is rotatable in the bearings 13. Suitably secured to one of the end walls, as 17, is a ring gear 20 which may be considered a prime mover or driving member. Power is transmitted to this gear from any suitable source by a shaft 21 having a beveled gear 22 in mesh wtih the gear 20.

The inner ends of the shafts 11 and 12 are in the present construction provided with eccentrics or wrists 23 and 24, respectively, said eccentrics or wrists being located in the cage 14 and having their inner ends spaced apart. These eccentrics may be made integral with the shafts or may be splined thereto, as indicated at 25. The shafts may also, if desired, have extended thrust bearings in the end walls, as by disks 26 carried by said shafts and rotatably seated in suitable recesses 27 provided for the purpose. Other forms of thrust bearings may of course be employed.

Mounted on the eccentrics 23 and 24 are blocks 28 and 29 that are located in the cage 14 and are thus given gyratory movements transversely of the axes of rotation of the shafts 11 and 12 when said shafts rotate with respect to the cage. The blocks 28 and 29, it will be noted by reference to Figure 6, are angular and their inner end portions are beveled, thus providing angularly disposed flat beveled faces 30 and 31, the faces 30 of the two blocks being in opposition and the faces 31 of the two blocks being correspondingly disposed.

Interposed between these blocks 28 and 29 is a floating guide and drive element 32, which is substantially I-shaped in cross section. In other words, it comprises a web 33 with oppositely tapered end flanges 34, providing guideways 35 in its opposite sides. These guideways slidably receive the beveled end portions of the blocks 28 and 29, the faces 31 of said block slidably engaging the inner inclined faces 36 of the flanges 34. It will thus be evident that the blocks 28 and 29 on their gyratory movements will slide back and forth in the guideways 35, and at the same time will move the interposed element in a direction transversely to said sliding movements. This transverse movement on the part of the element 32 is a true reciprocatory one within the cage 14, because it is held against any other movement by reason of wedge blocks 37 which are interposed between the bearing walls 15 of the cage 14 and the opposite straight end faces of the element 32. These wedge blocks have oppositely convergent faces 38 which slidably bear against the inclined faces 30 of the blocks 28 and 29.

By a comparison of Figures 2, 3 and 4, it will be noted that the wedge blocks 37 are capable of movement longitudinally of the axes of rotation of the shafts 11 and 12, and as these wedge blocks extend from end wall 16 to end wall 16, as indicated in Figure 5, they have a true reciprocatory movement.

There are therefore the following parts having the following movements: the cage 14, which is rotatable; the shafts 11 and 12 which are rotatable with the cage and are relatively rotatable with respect to the cage and with respect to each other; the blocks 28 and 29 which are capable of gyratory movements in the cage in opposite directions when the shafts 11 and 12 relatively rotate, or rotate in opposite directions; the interposed guide and driving member 32 which reciprocates between the gyratory elements 28 and 29 transversely of the shafts; and the wedge elements 37 which reciprocate longitudinally of the shafts.

In considering the operation of the mechanism, while it is true that the cage is rotated and the parts are therefore constantly assuming different perpendicular relations, and while the shafts when the vehicle is making a turn vary their relative speeds of rotation, it is believed for the purpose of explanation that it will simplify the same if the parts are considered as in a particular relation. Therefore it is to be understood that the terms "up" and "down" and "right" and "left" are merely for explanatory purposes.

Assuming the mechanism to be in the relation shown in Figure 10 which is substantially a horizontal section and Figures 2, 3 and 4 similarly illustrative, if the traction on the wheels connected to the shafts 11 and 12 is the same, or in other words, if the resistance to the movements of the driven shafts 11 and 12 is equal, these two shafts are in effect locked together. This will be evident when it is considered that the eccentrics 23 and 24 remain in their fixed relation. Consequently power transmitted from the gear 20 to the cake or housing 14 causes the wedge blocks 37 to rotate and these blocks cannot change their relation because of their bearings against the two blocks 28 and 29, which in turn cannot move with respect to each other because the eccentrics 23 and 24 remain in fixed relation. It will thus be clear that power is imparted equally to the two shafts 11 and 12, and even if the traction on one wheel or the resistance to the rotation of one of the shafts is reduced, as caused by one of the wheels running on to a slippery surface, yet the other shaft will continue to have the power applied thereto. Therefore the wheel that has traction will still operate to move the vehicle forward, and the danger of becoming stalled by reason of one wheel running on to a slippery surface, for instance, is thus overcome.

If, however, one of the shafts is caused to run at a slower speed than the other, the parts immediately begin to change their relation. Such a variation in speed is equivalent to the rotation of the shafts in opposite directions, though actually both are moving in the same direction, or one may be at a complete standstill. Assuming, for example, that the shaft 11 is theoretically moving clockwise, or in the direction of the arrow "A" of Figure 2, and the shaft 12 is moving counter-clockwise, or in the direction of the arrow "B", it will be clear that the eccentrics or wrists 23 and 24 are correspondingly rotated. The blocks 28 and 29 are therefore caused to gyrate in opposite directions. But in such movements they are together equally rising or falling. That is to say when one block is rising on one side, or is in one end of its guideway, the other block is rising exactly the same degree at the other side and is in the other end of its guideway. The consequence is that though they reciprocate oppositely in the guideways 35, they together raise and depress the interposed element 32 having said guideways. Furthermore it is to be noted that as they reciprocate oppositely in the guideways, and as will be clear by a comparison of Figures 2 and 3, one of these blocks, as 29, will be pushing on one of the wedge blocks 37 while the other will be moving out of the path of said wedge block and will be pushing on the opposite wedge block, room for which is being made by the first block that is operating on the first wedge block. As the parts continue, a reverse movement takes place, all of which will be clear by a comparison of Figures 3 and 4. It will be noted therefore that the relative rotation of the shafts is completely accommodated. Yet whenever the shafts are in condition to again rotate in unison and in synchronism, the parts no matter what their relation is, whether centered, as shown in Figure 2, or at either extreme, as illustrated in Figures 3 and 4, or at any intermediate point, will immediately lock both shafts together and to the driving means, because the eccentrics of said shafts immediately assume a fixed relation, and all the parts in turn become fixed with relation to the cage, which is the initial driving member.

That the structure is a simple and extremely compact one will be obvious. The parts moreover are rugged and not only is their number few, but the eccentric-carried blocks are duplicates, as are also the wedge blocks, thus greatly reducing manufacturing costs.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. The combination with relatively rotatable driven members, of means for transmitting driving power to the members and permitting their relative rotation, said means including an element movable substantially longitudinally of the axes of rotation of the driven members, and means having a back and forth movement and operated by the driven members when rotating for holding the element against such movement when the members correspondingly move and causing the said longitudinal movement when the members relatively move.

2. The combination with relatively rotatable driven members, of means for transmitting driving power to the members and permitting their relative rotation, said means including an element having a back and forth movement substantially longitudinally of the axes of rotation of the driven members, and means actuated back and forth by the driven members for holding the element against its back and forth movement when the members correspondingly move and effecting the said back and forth movement when the members relatively move.

3. The combination with relatively rotatable driven members, of means for transmitting driving power to the members and permitting their relative rotation, said means including an element movable substantially longitudinally of the axes of rotation of the driven members, and means operated in a back and forth direction by the relative rotation of said driven members for moving said element in said longitudinal direction.

4. The combination with relatively rotatable driven members, of means for transmitting driving power to the members and permitting their relative rotation, said means including an element having a back and forth movement substantially longitudinally of the axes of rotation of the driven members, reciprocatory means operating on said first element to move the same back and forth, and means rotating with the driven members and actuated on their relative rotation to reciprocate said means.

5. The combination with relatively rotatable driven members, of means for transmitting driving power to the members and permitting their relative rotation, said means including an element having a back and forth movement substantially longitudinally of the axes of rotation of the driven members, reciprocatory elements operating on said first element to move the same back and forth, and eccentrics carried by the driven members and engaged with the reciprocatory elements to cause their reciprocations on the relative rotation of the driven members.

6. The combination with relatively rotatable driven members, of means for transmitting power to the same and permitting their relative rotation, said means including elements movable transversely of the driven members and elements movable longitudinally of said driven members, means for causing the transversely movable elements to move in opposite directions when the driven members are relatively rotated, and engaging faces on the transversely and longitudinally movable elements for causing the longitudinally movable elements to be moved back and forth in said longitudinal direction by the transversely movable elements.

7. The combination with relatively rotatable driven members, of means for transmitting power to the same and permitting their relative rotation, said means including elements movable transversely of the driven members and elements movable longitudinally of said driven members, means for causing the transversely movable elements to have gyratory movements when the driven members relatively rotate, the longitudinally movable elements being located between the transverse elements and having bearing faces that cause them to be reciprocated by the transversely movable elements on the gyratory movements of said transversely movable elements.

8. The combination with relatively rotatable driven members, of means for transmitting power to the same and permitting their relative rotation, said means including elements movable transversely of the driven members and elements movable longitudinally of said driven members, rotatable eccentrics carried by the driven members and operating on the transversely movable elements to cause them to have gyratory movements when the driven members relatively rotate, the longitudinally movable elements being located between the transverse elements and having bearing faces that cause them to reciprocate on the gyratory movements of the transverse elements.

9. The combination with a rotatable cage and means for causing its rotation, of relatively rotatable shafts engaged with said cage, a cage driven element located in the cage and movable back and forth transversely of the cage, and means connected to the shafts for causing the element to have said transverse back and forth movement on the relative rotation of the shafts, and means acting to lock the shafts together and cause their corresponding rotation when the respective resistance to their rotation varies.

10. The combination with a rotatable cage and means for causing its rotation, of relatively rotatable shafts engaged with said cage, a cage driven element located in the cage and movable back and forth longitudinally of the cage, elements in the cage operating transversely of the shafts and acting on the first element to cause its said back and forth movement, and eccentric members carried by the shafts and engaging the transversely movable elements to cause their movements when the shafts relatively rotate.

11. The combination with a rotatable cage and means for causing its rotation, of relatively rotatable shafts engaged with said cage, a cage driven element located in the cage and movable back and forth longitudinally of the cage, elements in the cage operating transversely of the shafts and acting on the first element to cause its said back and forth movements, eccentric members carried by the shafts and engaging the transversely movable elements to cause their movements when the shafts relatively rotate, and a floating guide element interposed between and moved by the transverse elements, said guide element having a bearing against the longitudinally movable element.

12. The combination with a rotatable cage, and means for rotating it, of shafts journaled in the cage and having eccentrics thereon, gyratory blocks located in the cage and engaged with the eccentrics, a floating guide element interposed between the blocks and having guideways in which the blocks operate, and reciprocatory wedge blocks interposed between the cage and opposite sides of the guide element and between the gyratory blocks and reciprocated by the gyratory blocks on their gyratory movements.

13. The combination with a rotatable cage having opposite bearing walls, of means for rotating the cage, relatively rotatable shafts journaled in the cage and having eccentrics located between the bearing walls, transversely disposed blocks on the eccentrics and gyrated thereby, said blocks having opposed inclined faces, a floating guide and drive element interposed between the blocks and having guideways in which the blocks operate, and wedge blocks interposed between the opposite sides of the guide element and the opposite bearing walls of the cage, the inclined faces of said wedge blocks slidably contacting the inclined faces of the transverse blocks and being reciprocated thereby when the transverse blocks are gyrated by the eccentrics on the relative rotation of the shafts.

14. The combination with driven members, of a driving member therefor, means for transmitting driving power from the driving member to the driven members and permitting their relative rotation, said means including a plurality of gyratory elements, and other elements that are reciprocated by the gyratory elements in transversely disposed paths.

15. The combination with rotatable driven members, of a rotatable driving member, means for transmitting driving power from the driving member to the driven members and permitting their relative rotation, said means including gyratory elements that are gyrated in opposite directions on the relative rotation of the driven members, a reciprocatory element reciprocated by the gyratory elements, and other reciprocatory elements reciprocated by the gyratory elements in a path transverse to the path of the first reciprocatory element, all said elements being mounted to rotate with the driving member.

16. The combination with rotary driven members, of a rotary driving member therefor, a transversely movable floating guide interposed between the driven members and rotated by the driving member, a locking element slidable on the guide and movable longitudinally of the axes of the driven members, and elements operating on the driven members and having back and forth sliding bearings on opposite sides of the guide, said latter elements having bearings on the locking element and causing it to move longitudinally when the driven members relatively rotate.

17. The combination with a driving member including a rotary casing, of relatively rotatable driven members entering the casing, a floating guide in the casing between the driven members and reciprocable transversely thereof, locking elements interposed between opposite sides of the guide and casing and reciprocable longitudinally of the driven members, and gyratory elements on opposite sides of the guide and engaged with the locking elements to reciprocate the same, said gyratory elements being engaged with the driven members and with the guide to move the same and the locking elements when the driven members relatively rotate.

ARTHUR W. ARNOLD.